June 17, 1952  J. V. DRUM  2,600,742
WHEEL-HANDLING DEVICE
Filed May 17, 1949
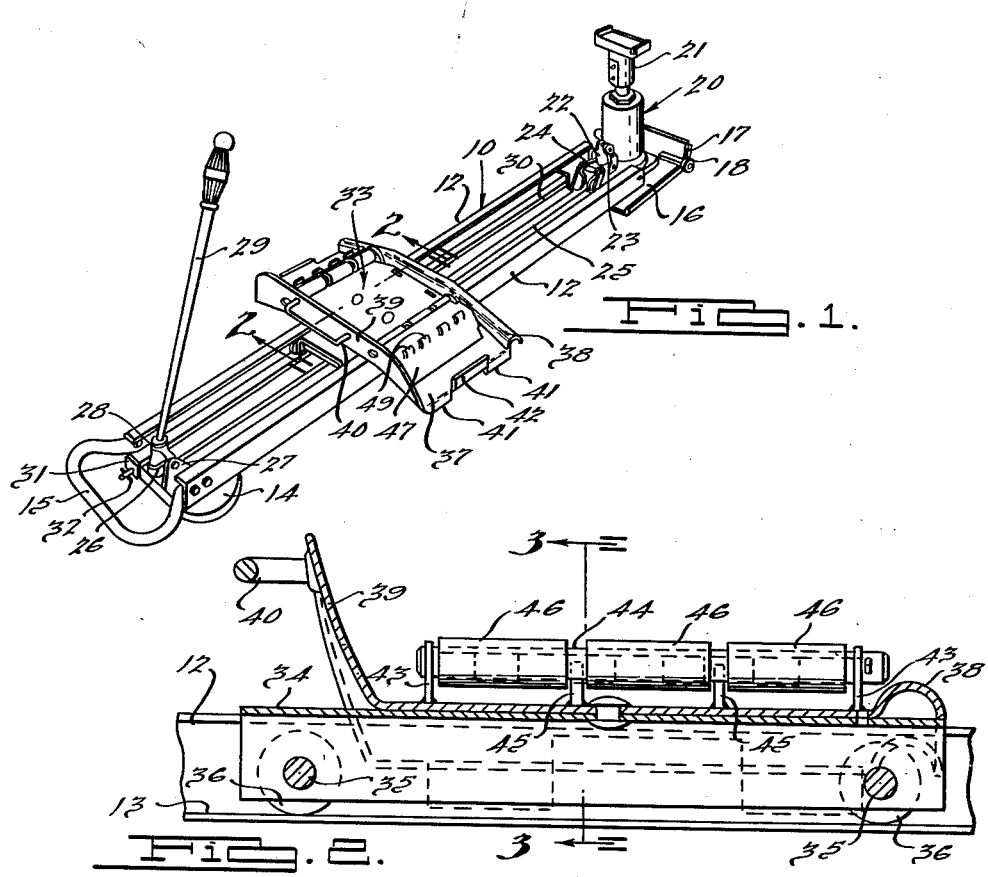
INVENTOR.
John V. Drum.
BY
Harness, Dickey & Pierce
ATTORNEYS.

Patented June 17, 1952

2,600,742

UNITED STATES PATENT OFFICE 2,600,742

WHEEL-HANDLING DEVICE

John V. Drum, Grosse Pointe, Mich., assignor to The Drum Corporation, Detroit, Mich., a corporation of Michigan Application May 17, 1949, Serial No. 93,811

9 Claims. (Cl. 214—1)

The present invention relates to wheel-handling devices, and particularly relates to improvements in the wheel supporting saddle for use on wheel-handling devices of the type disclosed in the copending application of John V. Drum, Serial No. 772,073, filed September 4, 1947.

The handling of large truck and tractor wheels, when it becomes necessary to remove or change the wheels, has presented a difficult problem. In the copending application of John V. Drum above referred to, a device is disclosed and claimed by which the truck or tractor axle may be raised and the wheel removed with safety, in that the operator can perform all of the necessary steps alone from a remote position without having to get under the vehicle. A unitary device is provided which includes an elongated trackway having a jack at one end, the jack control at the other end, and a movable tire-supporting saddle mounted thereon. The tire-supporting saddle extends transversely of the trackway and is constructed so that it may tilt as the wheel of the truck is moved onto it. The present invention is primarily concerned with improvements in the saddle, whereby the wheel may be positioned on the saddle more expeditiously and may be rotated for purpose of axial alignment, while it is supported on the saddle.

One of the primary objects of the present invention is to provide improvements in wheel-supporting devices of the type mentioned in which the wheel may be more easily rolled onto the support.

A further object of the invention is to provide improvements in saddles of the type mentioned in which the saddles are so constructed that as the wheel is rolled onto the saddle, the saddle may tilt with respect to the trackway, and at the same time will bite into the ground-engaging surface so that it and the trackway will not move out of position.

A further object of the invention is to provide improvements in wheel supports of the type mentioned in which means are provided to facilitate the axial rotation of the wheel while it is supported on the saddle so that it may be conveniently aligned in its proper position.

A further object of the invention is to provide improvements of wheel supports of the type mentioned which are of rugged construction, and in which the movable parts are guarded against breakage when the wheel is being positioned.

Other objects of the invention will become more apparent from the following specification, the drawing relating thereto, and from the claims hereinafter set forth.

In the drawing, in which like numerals are used to designate like parts in the several views throughout:

Figure 1 is a perspective view of a wheel-handling device embodying features of the present invention;

Fig. 2 is an enlarged cross-sectional view, taken substantially along the line 2—2 of Fig. 1;

Fig. 3 is a cross-sectional view, taken substantially along the line 3—3 of Fig. 2; and Fig. 4 is a perspective view of the saddle or wheel-supporting device of the present invention.

The changing of large vehicle wheels and tires, such as truck, trailer and tractor wheels, has been a difficult operation in that the wheels are so large and heavy that they are difficult to handle. It is particularly difficult for one man to effect a wheel removal or change, and when it is attempted there is considerable danger of injury. With the device of the present invention, the weight of the wheel is supported in the wheel-handling device, and with the vehicle frame raised it is a relatively easy and safe operation for one man to remove and change the vehicle wheel.

In the embodiment of the invention illustrated, a single wheel support is shown on the trackway, but it is to be understood that when used on dual wheel trucks, a pair of wheel-supporting members may be mounted on the trackway. Such wheel-supporting members may be connected together so that they may be moved as a unit.

Referring to the drawing, the wheel-handling device comprises an elongated base, generally indicated at 10. The base 10 includes a pair of facing side members 12 which are channel-shaped in cross section, and provide a pair of facing trackways 13. The outer ends of the channel members 12 are fixed to a transversely extending base member 14 in properly spaced relationship by welding, or the like. A handle 15 is suitably connected to the outer ends of the channel members 12 by means of bolts.

The opposite or inner ends of the members 12 are suitably fixed as by welding, for example, to a transversely extending plate member 16, which has the inner end thereof curved upwardly, as indicated at 17, to form a skid so that the unit may be moved along the ground. Rollers 18 may be provided on the skid at opposite sides thereof to facilitate movement of the unit.

A jack, generally indicated at 20, is mounted on the plate member 16 adjacent the inner ends of the trackways 12, and the jack per se may be of conventional construction and may be either mechanically or hydraulically actuated. For purposes of illustration, the jack 20 is a hydraulic jack with the base thereof mounted on and fixed to the member 16.

A jack extension or adapter 21 is mounted on the top of the jack 20 and is adapted to engage either the axle or another suitable part of the underside of the vehicle. The jack extension 21 is not part of a conventional jack, but is removably mounted on the top of the vertically movable jack rod.

The jack rod extends into the jack cylinder, and is raised through the action of a reciprocating pump 22 which is connected through suitable linkage 23 with the bell crank arms 24. The bell crank arms 24 are actuated by a push rod 25 which is pivotally connected to one of the ends thereof, and which extends longitudinally of the base 10 and at the bottom of the trackways 12. The opposite end is pivotally connected to one end of a bell crank socket 26. The bell crank socket 26 is pivotally connected to brackets 27 and has a socket 28 within which the lower end of an operating handle 29 is received. By reciprocating the handle 29, the push rod 25 is actuated through the bell crank 26 and, in turn, reciprocates the plunger of pump 22 through links 23 and 24 to raise the hydraulic jack. The vehicle is lowered in the usual way of turning a valve in the base of the jack by means of an operating rod 30. The rod 30 also extends parallel to the push rod 25, and is supported on the base 14 by means of a bracket 31. A finger pin 32 extends through the projecting end of the rod 30 and by turning the rod 30 the jack valve is actuated so that it may be lowered.

The wheel support of the present invention is generally indicated at 33, and is mounted on the base 10 for movement therealong. The wheel support comprises a carriage 34 which is in the form of an inverted channel section having a pair of longitudinally-spaced, transversely extending shafts 35 extending through aligned openings in the depending flanges thereof and adjacent the ends, and projecting beyond the sides of the flanges. The shafts 35 have rollers 36 journalled in the ends thereof, and the rollers 36 are received within the trackways 13 for mounting the carriage 33 for movement along the ground support, or base, 10.

A wheel-supporting bottom member 37, in the form of a saddle open at its ends, is mounted on the carriage 34. The support 37 comprises a transversely extending member which is secured to the top of the carriage 34 by means of rivets or the like. The ends of the member 37 extend beyond the sides of the base 10 and are inclined downwardly toward the ground.

A rolled bead 38 is formed along the inner end of the member 37 for the purpose of strengthening and stiffening it, and an upstanding side flange 39 is formed along the other side. A handle 40 is mounted on the upstanding side 39.

The projected ends of the member 37 are provided with downwardly directed flanges 41 along the bottom edges thereof. Upwardly directed flanges 42 are formed in the ends between the downwardly directed flanges 41. The purpose of such flanges will be described hereinafter.

Roller means are mounted on the top surface of the member 37, and such roller means include upstanding brackets 43 which are welded to the top surface of the member 37 and which support a roller shaft 44 therein. Intermediate reinforcing brackets 45 are also welded to the top surface of the member 37 intermediate the ends of the shaft 44 and serve to support such shaft intermediate its ends.

Rollers 46 are rotatably mounted on the shafts 44. Roller guards 47, in the form of transversely extending plates, are mounted on the member 37 by means of brackets 48 on the leading or entering side of their respective rollers 46, and are positioned to protect the rollers as the wheels are rolled onto the central supporting position of the saddle 33. The guards 47 have outstruck tabs 49 thereon which extend outwardly and upwardly, and which provide gripping projections for the wheel tire as it is rolled up over the guard 47.

The wheel-supporting member 33, including the carriage 34 and the wheel-supporting member 37, may be moved longitudinally of the base by engagement of the rollers 36 in the trackways 13. A pull rod having a hook in the end may be employed for moving the unit 33 by engaging the handle 40.

In the use of the device above described, when it is desired to remove a vehicle wheel, the wheel-changing device as a unit may be positioned adjacent to and in line with the wheel to be removed, and the vehicle may be moved to place the wheel within the saddle 33. As the wheel engages the leading edge of the saddle 33, the saddle will tilt to permit the wheel to run up the leading end. This is permitted by the clearance between the tops of wheels 36 and the facing surfaces of the upper trackways. When the saddle is thus tilted, the downwardly directed flanges on the member 37 will bite into the ground-engaging surface so that the unit will not be moved out of position. At the same time, the wheel will engage the upwardly directed flange 42 which assists in keeping the wheel moving in the right direction on the saddle. The wheel will then strike the guard 47 which protects the rollers, and at the same time will be further assisted in its movement by the projecting flanges 49. The wheel will then move over the roller 46 to the central position where it will rest upon the rollers 46 and the central portion of the support 37.

The jack 20 will then be in a position under the axle and may be raised to lift the axle and support the vehicle. With the wheel so positioned, it may then be unfastened from the axle and the operator may then pull the wheel away from the vehicle by moving the wheel-supporting unit 33 outwardly.

When replacing the wheel, it is rolled up on the saddle in the same way and moved toward the axle. In order to assist in the alignment of the wheel with the axle, it may be rotated on rollers 46.

Formal changes may be made in the specific embodiment of the invention described without departing from the spirit and substance of the subjoined claims.

What is claimed is:

1. A wheel-handling device comprising an elongated base, a wheel bottom support positioned transverse to said base and adapted to engage the bottom of the wheel, said wheel bottom support comprising a substantially U-shaped member extending transverse to said base having the ends thereof extending beyond the sides of said base and inclined downwardly so as to form a ramp for a wheel, and means mounting said wheel support for movement along said base while supporting said wheel and for transverse tilting movement in both directions with respect thereto, each of said ends having an upwardly directed flange adapted to engage the wheel.

2. A wheel-handling device comprising an elongated base, a wheel bottom support positioned transverse to said base and adapted to engage the bottom of the wheel, said wheel bottom support comprising a substantially U-shaped member extending transverse to said base having the ends thereof extending beyond the sides of said base and inclined downwardly so as to form a ramp for a wheel, and means mounting said wheel support for movement along said base while supporting said wheel and for transverse tilting movement in both directions with respect thereto, each of said ends having a downwardly directed flange adapted to engage the ground and each of said ends having an upwardly directed flange adapted to engage the wheel.

3. A wheel-handling device comprising an elongated base, a wheel bottom support positioned transverse to said base and adapted to engage the bottom of the wheel, said wheel bottom support comprising a substantially U-shaped member extending transverse to said base having the ends thereof extending beyond the sides of said base and inclined downwardly so as to form a ramp for a wheel, means mounting said wheel support for movement along said base and for transverse tilting movement in both directions with respect thereto, each of said ends having a downwardly directed flange adapted to engage the ground and each of said ends having an upwardly directed flange adapted to engage the wheel, and roller means on said support extending transversely thereof at spaced positions longitudinally thereof adapted to engage the wheel when supported on said wheel support.

4. A wheel-handling device comprising an elongated base, a wheel bottom support positioned transverse to said base and adapted to engage the bottom of the wheel, said wheel bottom support comprising a member extending transverse to said base having the ends thereof extending beyond the sides of said base, means mounting said wheel support for movement along said base and for transverse tilting movement in both directions with respect thereto, roller means on said support extending transversely thereof at spaced positions longitudinally thereof adapted to engage the wheel when supported on said wheel support, and inclined guards mounted on said support adjacent said roller means and on the leading sides thereof.

5. A wheel-handling device comprising an elongated base, a wheel bottom support positioned transverse to said base and adapted to engage the bottom of the wheel, said wheel bottom support comprising a member extending transverse to said base having the ends thereof extending beyond the sides of said base, means mounting said wheel support for movement along said base and for transverse tilting movement in both directions with respect thereto, roller means on said support extending transversely thereof at spaced positions longitudinally thereof adapted to engage the wheel when supported on said wheel support, and inclined guards mounted on said support adjacent said roller means and on the leading sides thereof, said guards having projections thereon to grip the wheel as it rolls thereover.

6. A wheel-handling device comprising an elongated base, a carriage on said base, means mounting said carriage on said base for movement therealong, and a wheel bottom support mounted on said carriage for movement therewith, said wheel support comprising a substantially U-shaped member extending transversely to said carriage having the ends thereof extending beyond the sides of said base and inclined downwardly so as to form a ramp for a wheel, each of said ends having an upwardly directed flange adapted to engage the wheel.

7. A wheel-handling device comprising an elongated base, a carriage on said base, means mounting said carriage on said base for movement therealong, and a wheel bottom support mounted on said carriage for movement therewith, said wheel support comprising a substantially U-shaped member extending transversely to said carriage having the ends thereof extending beyond the sides of said base and inclined downwardly so as to form a ramp for a wheel, each of said ends having a downwardly directed flange adapted to engage the ground and each of said ends having an upwardly directed flange adapted to engage the wheel.

8. A wheel-handling device comprising a carriage, roller means on said carriage, a wheel bottom support positioned transverse to said carriage and adapted to engage the bottom of the wheel, said wheel bottom support comprising a member extending transverse to said carriage having the ends thereof extending beyond the sides of said base, each of said ends having a downwardly directed flange adapted to engage the ground and each of said ends having an upwardly directed flange adapted to engage the wheel, roller means on said member extending transversely thereof at spaced positions longitudinally thereof, and inclined guards mounted on said member adjacent said roller means and on the leading sides thereof.

9. A wheel-handling device comprising a carriage, roller means on said carriage, a wheel bottom support positioned transverse to said carriage and adapted to engage the bottom of the wheel, said wheel bottom support comprising a member extending transverse to said carriage having the ends thereof extending beyond the sides of said base, each of said ends having a downwardly directed flange adapted to engage the ground and each of said ends having an upwardly directed flange adapted to engage the wheel, roller means on said member extending transversely thereof at spaced positions longitudinally thereof and inclined guards mounted on said member adjacent said roller means and on the leading sides thereof, said guards having projections thereon to grip the wheel as it rolls thereover.

JOHN V. DRUM.

REFERENCES CITED

The following references are of record in the file of this patent:

UNITED STATES PATENTS

| Number | Name | Date |
|---|---|---|
| 863,122 | Weber | Aug. 13, 1907 |
| 1,819,450 | Weller | Aug. 18, 1931 |
| 2,012,635 | Paden | Aug. 27, 1935 |
| 2,053,646 | Whalen | Sept. 8, 1936 |
| 2,254,564 | Caslake | Sept. 2, 1941 |
| 2,321,602 | Jensen | June 15, 1943 |
| 2,345,458 | Caron | Mar. 28, 1944 |
| 2,497,960 | Salzman | Feb. 21, 1950 |
| 2,502,924 | Care et al. | Apr. 4, 1950 |
| 2,539,274 | Sagen | Jan. 23, 1951 |